United States Patent [19]

Raabe

[11] Patent Number: 4,709,576
[45] Date of Patent: Dec. 1, 1987

[54] LEAK DETECTION METHOD AND APPARATUS

[75] Inventor: Austin B. Raabe, Alpharetta, Ga.

[73] Assignee: Applied Biology, Inc., Decatur, Ga.

[21] Appl. No.: 918,368

[22] Filed: Oct. 14, 1986

[51] Int. Cl.$^4$ ............................................. G01M 3/04
[52] U.S. Cl. .................................... 73/40.5 R; 73/40.7
[58] Field of Search .................... 73/40.5 R, 40.7, 40, 73/19

[56] References Cited

U.S. PATENT DOCUMENTS 3,106,089 10/1963 Scott et al. ...................... 73/40.7 X
3,459,036 8/1969 Powell ............................. 73/40.7 X

FOREIGN PATENT DOCUMENTS 18391 2/1977 Japan ..................................... 73/40.7
106837 7/1982 Japan ............................... 73/40.5 R Primary Examiner—Stewart J. Levy
Assistant Examiner—Joseph W. Roskos
Attorney, Agent, or Firm—James B. Middleton

[57] ABSTRACT

Apparatus for determining if an underground storage tank is leaking provides simple determination by a layman. A housing containing a detection tube is lowered into a well in the vicinity of the tank, and a vacuum pump pulls air through the detection tube. The sampled air will disclose the presence, or not, of vapor from the suspected tank. The method includes the use of discrete sample of air, and the quantity of air is determined by use of a detection tube sensitive to carbon dioxide. An indication of a quantity of carbon dioxide can be related to a volume of air through known relationships. Preferably, the housing containing the detection tube is carried by a float so the intake is just above the surface of any water in the well.

10 Claims, 4 Drawing Figures

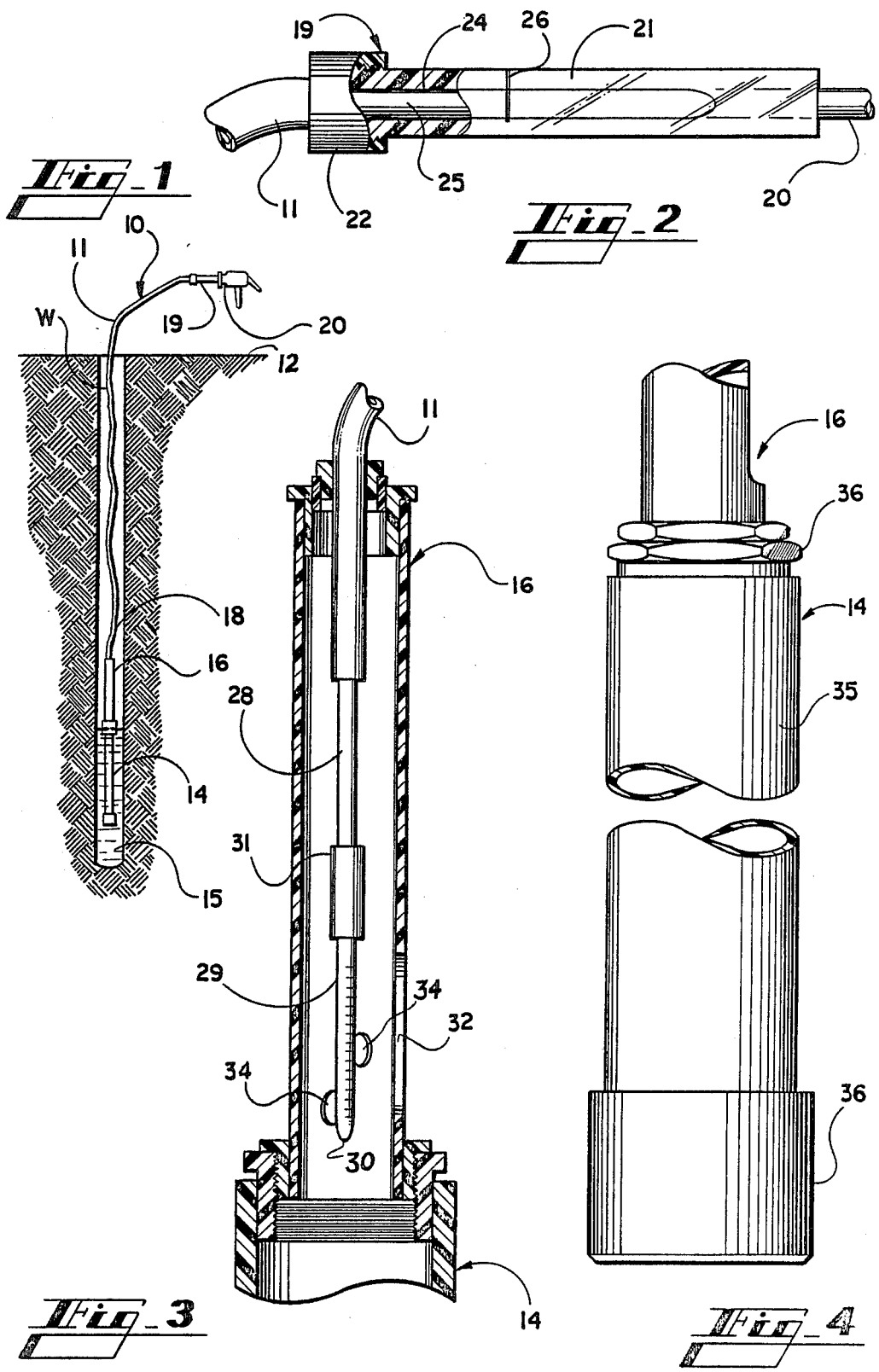

LEAK DETECTION METHOD AND APPARATUS

INFORMATION DISCLOSURE STATEMENT

It is common for various materials to be stored in underground storage tanks, one of the most common examples being the storage of gasoline and comparable petroleum products. It has been widely recognized that many of these underground storage tanks leak, thereby discharging petroleum products into the surrounding earth, and frequently placing petroleum products into the ground water. The leakage of the storage tanks is frequently caused by normal corrosion or rusting of the tank, and one would not be aware of the slow deterioration of the tank since it is underground.

Since the realization that there is a problem with leaking storage tanks, efforts have been made to inspect suspected tanks, which requires excavation in order to make a visual inspection, and this is of course very costly. Alternatively, there have been efforts to provide an additional lining for the interior of the tank to prevent leakage. While the lining may be an economical means for stopping leaks, it may be considered expensive if the tank is in fact not leaking.

Heretofore, leaking storage tanks have been detected by such means as analyzing ground water in a given vicinity in an effort to detect the presence of chemicals that are stored in the vicinity. This method is both uncertain and costly, and further identifies a leaking storage tank only after there is some considerable contamination of surrounding ground water.

SUMMARY OF THE INVENTION

This invention relates generally to a method and apparatus for detecting leaking underground storage tanks, and is more particularly concerned with a method for detecting vapors in the ground surrounding a storage tank, and apparatus for quickly and economically detecting the presence of vapors.

The present invention provides a method for detecting leaking underground storage tanks wherein a well is provided in the immediate vicinity of the storage tank, and the air within the well is sampled and analyzed to determine if unwanted vapors are present. The method includes the sampling of a given volume of air so that a quantification of vapors can be made; however, the method preferably includes the step of providing a readily discernable indication of a given proportion of vapor in the air so that an unskilled person can determine if a tank is leaking.

The apparatus of the present invention includes conduit means receivable within a well, and means for moving air through the conduit means. A volume measuring means is provided so the operator can determine when a predetermined volume of air has passed through the conduit means to assure that a proper sample has been taken. The conduit means further includes vapor detection means for indicating whether or not vapor is present. In the preferred embodiment of the invention, a float is provided so the vapor detection means will be disposed immediately above the water level, in the event there is water in the well.

BRIEF DESCRIPTION OF THE DRAWINGS

These and other features and advantages of the present invention will become apparent from consideration of the following specification when taken in conjunction with the accompanying drawings in which:

FIG. 1 is an elevational view showing vapor detection apparatus made in accordance with the present invention received within a well;

FIG. 2 is an enlarged elevational view, partially broken away, showing the volume indicating means used in the apparatus shown in FIG. 1;

FIG. 3 is an enlarged, longitudinal cross-sectional view of the housing shown in FIG. 1, and showing the vapor indicating means and a secondary volume measuring means; and, FIG. 4 is an enlarged elevational view showing the float means disclosed in FIG. 1, the float being partially broken away.

DETAILED DESCRIPTION OF THE EMBODIMENT

Referring now more particularly to the drawings, and to that embodiment of the invention here presented by way of illustration, FIG. 1 shows the vapor detection apparatus generally designated at 10 having the conduit inserted into a well W. Those skilled in the art will realize that, for a given chemical within a storage tank, the chemical vapors will disperse through the earth 12 at a known, or determinable, rate. Because of this fact, the well W can be drilled at any reasonable distance from the storage tank itself; and, the quantity of vapor detected at the chosen location, in conjunction with the rate of dispersion of the given chemical, can indicate the rate of loss of chemical from the storage tank.

Looking further at the leak detection device 10 in FIG. 1, it will be seen that the lower end of the device 10 includes a float 14, here shown as immersed in water 15 in the bottom of the well W. Above the float 14, there is a housing 16 which carries the apparatus to indicate the presence of vapor. The housing 16 is then connected to the end of a conduit 18 which extends upwardly, above ground 12 to connect to the volume measuring means 19. The volume measuring means 19 is carried by air moving means 20, here shown as a hand operated vacuum pump.

At this point, it should be understood by those skilled in the art that virtually any means can be utilized to move a quantity of air through the conduit 18, and through the system. The hand operated vacuum pump 20 works quite well, and is readily portable. Since a rather small quantity of air is generally to be sampled (perhaps 100 ml), the hand operation presents no difficulty.

Virtually any volumetric measuring means can be utilized as the volume indicating means 19, including mechanical flow meters and the like. FIG. 2 shows the preferred volume indicating means 19 in more detail, and it will be seen that the conduit 11 is fixed to a transparent housing 21 by a fitting 22. A central bore 24 within housing 21 receives a detection tube 25 therein. The detection tube 25 completely fills the bore 24 in the housing 21, and the arrangement is such that all gas passing through the conduit 11 will pass through the detection tube 25, gas being forced through the device by the vacuum pump 20.

The detection tube 25 may take many forms, but one successful apparatus utilizes a commercially available detection tube for indicating carbon dioxide. Since the percentage of carbon dioxide in the air is known, the detection of a given quantity of carbon dioxide can be directly related to a given quantity of air. The detection tube 25 will contain a chemical such as hydrazine with a color indicator. Thus, as air passes from the conduit 11 into the detection tube 25, the color of the detection tube 25 will change. A mark such as the mark 26 can be provided on the housing 21 or the tube 25 to indicate when the desired quantity of air has passed through the volume indicating means 19. When the color change reaches the mark 26, the operator will cease operation of the vacuum pump 20 knowing the desired quantity of air has passed through the system.

Looking now at FIG. 3 of the drawings, it will be seen that the conduit 11 is sealed with respect to the housing 16, and receives, in series, a secondary volume indicating means 28, and the vapor indicating means 29. Air will enter the lowermost end 30 of the detection tube 29, pass through the detection tube 29, through the connector tubing 31, and through the secondary volume indicating means 28. From the volume indicating means 28, the air will pass through the conduit 11.

The detection tubes 29 and 28 are similar to the detection tube 25, but may contain different chemicals. The vapor detection tube 29 may contain, for example, potassium dichromate. The potassium dichromate will change color when a petroleum vapor, such as hexane, passes therethrough. It will be noted that the housing 16 may define a window 32 adjacent to the vapor detection tube 29 so the vapor detection tube can be viewed by the operator without removal from the housing 16.

The housing 16 is fixed to the upper end of the float 14, and the housing 16 supports the detection tubes 28 and 29 in relation to the float 14. The housing 16 may further define additional openings 34 to allow air to enter the lower end of the housing 16. While a sufficient quantity of air can enter through the window 32, the window 32 may be closed by transparent material, the entire housing 16 can be made of transparent material to allow viewing of the vapor detection tube 29, or the window 32 may be omitted. In either of these latter events, the holes 34 will allow entry of air into the housing 16.

As is shown in FIG. 1 of the drawings, the float 14 will be substantially submerged in water in the event water is present in the well W. This will place the holes 34 just above the surface of the water. This position is especially desirable in order to pick up vapors that are in equilibrium with and volatilizing from the water.

Finally, looking at FIG. 4 of the drawings, it will be seen that the float means 14 comprises a length of pipe 35 closed at its lowermost end by a cap 36. The upper end of the pipe 35 receives bushings 36 to reduce the diameter to that of the housing 16. Pipes such as polyvinylchloride (PVC), chlorinated polyvinylchloride (CPVC), and other generally rigid plastic pipes are well suited to the construction of both the float 14 and the housing 16. These materials can be assembled using screw threads, adhesives and/or compression fittings, all of which are well known in the art. It should be noted that at least some of the joints are preferably threaded to allow disassembly of the apparatus. The importance of disassembly will become apparent from the description of the operation which follows.

In view of the above description, operation of the device should be understandable. One must first drill a well such as the well W, and the well W will be in the vicinity of storage tanks to be tested. The housing 16 will be fitted with a vapor detection tube 29, and the volume indicating means 19 will be fitted with a detection tube 25. With the entire apparatus 10 appropriately assembled, the float 14 with the attached housing 16 will be lowered into the well 11 by the conduit 11. The unit will be lowered carefully until the float 14 engages the water 15 at the bottom of the well, and the unit will be lowered until the conduit 11 becomes slack, indicating that the float 14 is in fact floating in the water 15 so the intake 34 in the housing 16 is just above the water level. The vacuum pump 20 will now be operated to move air through the detection device 10. The operator will continue to operate the vacuum pump 20, observing the change in color in the detection tube 25. When the change in color reaches the mark 26, the operator will cease operation of the vacuum pump 20. The sample has been taken, and the detection apparatus 10 can now be removed from the well W. The conduit 11 will be used to pull the float 14 and the housing 16 from the well W; and, when the housing 16 is available to the operator, the operator will look through the window 32 at the vapor detection tube 29. If the vapor detection tube 29 has changed color, the operator will know that vapor is present in the well, and that the storage tanks may be leaking. Further, since the vapor detection tube 29 can also include indicia indicating quantity, it may be determined that vapor is present, but that it is present in a normal, or background, quantity, thereby indicating that the storage tanks are not leaking.

If a person such as a service station attendant, needs simply to know whether or not vapor is present, the above described procedure can be used, and the detection tube can be disposed of and replaced for future use of the detection apparatus. On the other hand, if additional information is desired, the above described procedure will be followed, but using a vapor adsorption tube, an impinger or other known sampling device as the detection tube 29. The tube 28 can then be sent to a laboratory for further analysis. Those skilled in the art will understand that, with complete analysis by known techniques, a reasonably precise proportion of vapor to air can be determined, and the exact nature of the vapor can be determined.

It will therefore be seen that the present invention provides an extremely simple method for determining whether or not underground storage tanks are leaking. Further, the method of the present invention can be utilized at any location to determine the presence of a given vapor. While petroleum products have been used in the above discussion by way of example, virtually any vapor can be detected simply by changing the vapor detection tube 29 to include a chemical that will appropriately react with the suspected vapor, or retain a sample of the suspected material. By placing the vapor detection tube 29 in series with the volume indicating means 25 and/or 28, there will be an indication that the desired volume of air has passed through the vapor detection tube 29.

Those skilled in the art will realize that a single volume indicating means may be used, or two or more in series may be used. It should be noted, however, that the first tube to receive a given quantity of air will substantially absorb the carbon dioxide from that quantity of air, and a second tube receiving the same quantity would not react as desired. Thus, if two such tubes are used in series, there muast be a volume of air between the tube so that different specific quantities of air pass through the two tubes. With the limitation, the volume indicating tubes may be placed anywhere along the path traversed by air.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

What is claimed is:

1. Apparatus for detecting the presence of vapor within a well or the like, said apparatus including a housing receivable within said well, conduit means fixed to said housing and in communication therewith, said conduit means extending from said well and having an upper end, volume indicating means connected to said upper end of said conduit means, pump means connected to said volume indicating means for moving air through said housing, said conduit means, and said volume indicating means, and vapor indicating means received within said housing and in communication with said conduit means so that said air must pass through said vapor indicating means.

2. Apparatus as claimed in claim 1, said volume indicating means comprising a detection tube for indicating a predetermined quantity of a component of air.

3. Apparatus as claimed in claim 2, wherein said component of air is carbon dioxide.

4. Apparatus as claimed in claim 1, and further including float means carrying said housing, the arrangement being such that said float means will float in water in said well and hold said housing above the water.

5. Apparatus as claimed in claim 4, said housing defining an air inlet adjacent to said float means so that said air inlet is disposed immediately above the level of water.

6. Apparatus as claimed in claim 5, said housing defining window means to provide for visual inspection of said vapor detection tube.

7. Apparatus as claimed in claim 6, said volume indicating means comprising a detection tube for indicating a predetermined quantity of a component of air.

8. A method for determining if an underground storage tank is leaking, including the steps of providing a well in the immediate vicinity of the storage tank, placing a detection tube into the well, said detection tube being sensitive to vapors of the material stored in the storage tank, passing a predetermined quantity of air through said detection tube while said detection tube is within said well, and examining said detection tube to determine the presence of said vapors, wherein said step of placing a detection tube into the well is carried out by extending a conduit carrying said detection tube into said well, and further including the step of pulling air through said conduit in order to pass said predetermined quantity of air through said detection tube, said step of passing a predetermined quantity of air through said detection tube including the steps of placing a second detection tube in communication with said conduit so that said quantity of air passes through said second detection tube, said second detection tube being sensitive to a normal component of air.

9. A method as claimed in claim 8, and further including the step of providing a housing for said detection tube, and floating said housing on water at the bottom of said well so that said detection tube receives air from a position adjacent to the surface of the water.

10. A method as claimed in claim 9, and including the step of placing said second detection tube outside said well for viewing during the carrying out of the step of passing a predetermined quantity of air through said detection tube while said detection tube is within said well.

* * * * *